United States Patent [19]

Rainey et al.

[11] Patent Number: 5,784,337

[45] Date of Patent: Jul. 21, 1998

[54] TOWED ARRAY WITH NON-ACOUSTIC SENSOR MODULE

[75] Inventors: Kenneth P. Rainey, Oakdale; Joseph P. Liguore, Ledyard; Joseph J. Podurgiel, Quaker Hill, all of Conn.

[73] Assignee: The United States of America as represented by the Secretary of the Navy, Washington, D.C.

[21] Appl. No.: 812,065

[22] Filed: Jan. 21, 1997

[51] Int. Cl.⁶ ........................................ G01S 3/80
[52] U.S. Cl. .................. 367/131; 367/130; 367/154; 367/134
[58] Field of Search ........................ 367/131, 134, 367/130, 106, 15, 154; 174/108; 138/125, 130, 174; 139/204

[56] References Cited

U.S. PATENT DOCUMENTS 4,250,351  2/1981  Bridges ........................... 174/108
4,304,456  12/1981  Takaki et al. .................... 439/204
4,343,333  8/1982  Keister ............................ 138/125
5,631,874  5/1997  Mastin et al. .................... 367/134

*Primary Examiner*—Daniel T. Pihulic
*Attorney, Agent, or Firm*—Michael J. McGowan; Prithvi C. Lall; Michael F. Oglo

[57] ABSTRACT

A towed array includes an array of N hydrophone groups and one or more non-acoustic sensor modules structurally connected in-line with the array of hydrophone groups. The hydrophone groups and non-acoustic sensor module(s) are coupled to a common data transmission line. Each of the hydrophone groups defines a portion of an acoustic aperture occupying a specified length of the towed array. Each non-acoustic sensor module has a length that is n times the specified length where n is a whole number multiple of the total number of hydrophone groups.

11 Claims, 1 Drawing Sheet

1

TOWED ARRAY WITH NON-ACOUSTIC SENSOR MODULE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to towed arrays, and more specifically towed sonar arrays incorporating non-acoustic sensors.

(2) Description of the Prior Art

Towed sonar arrays are used extensively in a variety of naval, marine and seismological applications. It is desirable to determine non-acoustic characteristics of the towed array at various positions therealong in order to allow the acoustic information to be processed more accurately. Such non-acoustic characteristics include heading, depth, roll, temperature, etc., which are used for determining, for example, position of the towed array.

SUMMARY OF THE INVENTION

Accordingly, it is an object of the present invention to provide an apparatus for determining non-acoustic characteristics of a towed sonar array at various positions along the array.

Another object of the present invention is to provide an apparatus for determining non-acoustic characteristics of a towed sonar array without compromising the acoustical performance of hydrophones in the sonar array.

Still another object of the present invention is to provide an apparatus for measuring non-acoustic data along a towed sonar array and for integrating the transmission of the non-acoustic data with the acoustic data.

Other objects and advantages of the present invention will become more obvious hereinafter in the specification and drawings.

In accordance with the present invention, a towed array includes an array of N hydrophone groups structurally interconnected and coupled to a common data transmission line. Each of the hydrophone groups is part of an acoustic aperture that occupies a specified length of the towed array. One or more non-acoustic sensor modules are structurally connected in-line with the array of hydrophone groups. Each non-acoustic sensor module is coupled to the common data transmission line and is equipped to transmit non-acoustic data on the common transmission line along with the acoustic data from the hydrophones. Each non-acoustic sensor module has a length that is n times the specified length of a hydrophone group's acoustic aperture. The value of n is a whole number satisfying the relationship $1 \leq n \leq N$ where N is the total number of hydrophone groups in the array.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 1:
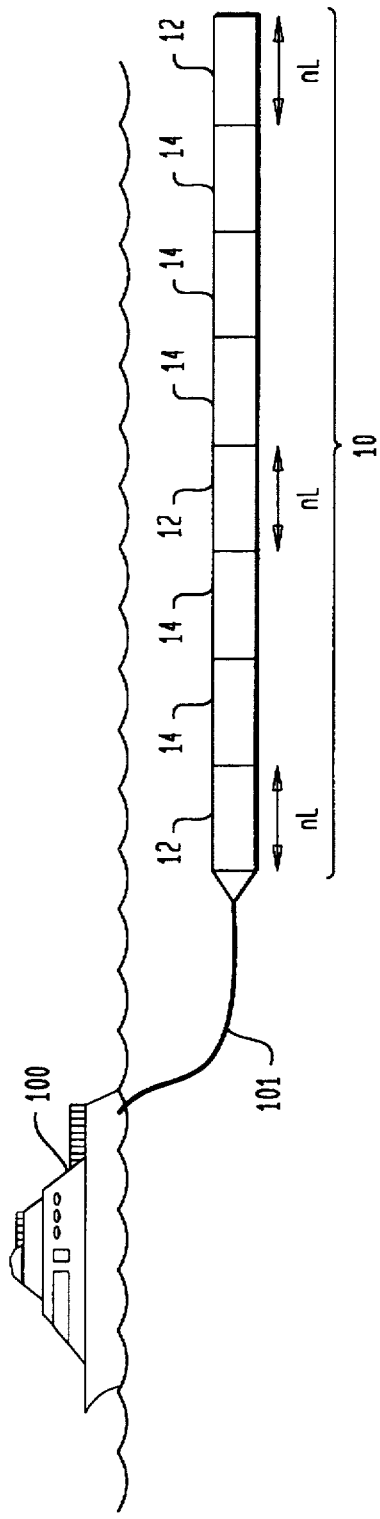
FIG. 1 is a schematic drawing illustrating possible positioning of non-acoustic sensor modules of the present invention within a towed sonar array system.

Referring now to the drawings, and more particularly to FIG. 1, ship 100 is shown pulling towed array 10 through the water by means of tow line 101. Towed array 10 includes one or more non-acoustic modules 12 and a plurality of hydrophone groups 14. Each hydrophone group 14 is generally representative of several hydrophones, each of which defines a portion of an acoustic aperture of the group. Each acoustic aperture requires or occupies a specified length L along towed array 10.

Each non-acoustic module 12 is a dedicated module for measuring non-acoustic data and for transmitting the non-acoustic data over the same transmission line (not shown in FIG. 1) used by hydrophones 14 as will be explained in greater detail below. Non-acoustic modules 12 can be located at either or both ends of towed array 10 and/or between any two of hydrophones 14. The length of each non-acoustic module 12 can be equal to the specified length L of towed array 10 required for an acoustic aperture associated with several hydrophone groups 14. The length of each non-acoustic module 12 could also be a whole number multiple n of the specified length L. Accordingly, the length of each non-acoustic module 12 is designated in FIG. 1 as nL. However, the whole number multiple n should not exceed the total number N of hydrophone groups 14 in towed array 10. (For the example in FIG. 1, N=5.) Thus, n is a whole number satisfying the relationship $1 \leq n \leq N$. This minimizes the impact of non-acoustic modules 12 on the acoustic performance of hydrophone groups 14 and allows placement of non-acoustic modules 12 anywhere along towed array 10.

Figure 2:
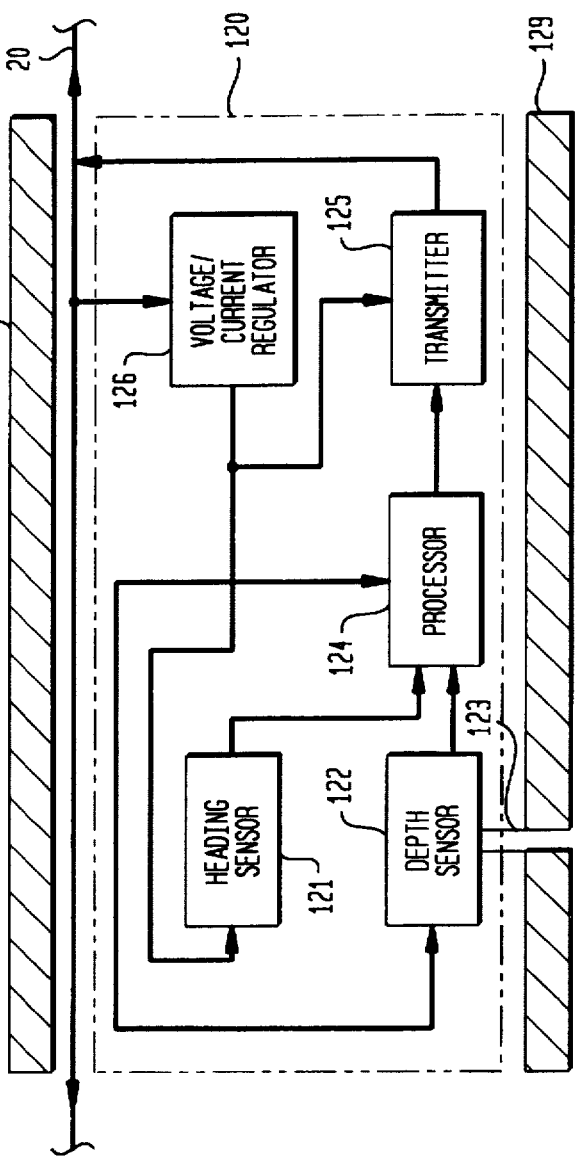
FIG. 2 is a schematic view of the electronics of an embodiment of the non-acoustic sensor module configured for measuring heading and depth information as it is housed within the flexible reinforced hose of the non-acoustic sensor module.

The electronics portion of one of non-acoustic modules 12 is referenced by the elements contained within the dashed line box 120 shown in FIG. 2. Electronics portion 120 is housed within hose 129, the details of which will be described further below. By way of example, it will be assumed that non-acoustic module 12 is designed to non-acoustically sense and transmit heading and depth data. As is known in the art, heading and depth data are useful in determining position. Thus, the heading and depth data sensed/transmitted from each location of non-acoustic modules 12 along towed array 10 can be used to determine the position of that particular location of towed array 10.

Electronics portion 120 of each non-acoustic module 12 includes non-acoustic heading sensor 121 and non-acoustic depth sensor 122. Heading sensor 121 can be a NUWC-2BOT available from Arthur D. Little Corporation. Depth sensor 122 can be a 181 KT available from Parascientific Corporation. Typically, heading sensor 121 measures magnetic fields, although the above-identified commercially available heading sensor is also equipped to measure roll and pitch. Depth sensor 122 is generally ported through hose 129 to surrounding seawater by means of porting tube 123 in order to sense depth pressure. Note that the above-identified commercially available depth sensor is also equipped to measure temperature.

Sense conditions are passed as signals from heading sensor 121 and depth sensor 122 to processor 124. Processor 124 is any suitable processing unit that collects the sensed data signals and formats them in a manner commensurate with the format transmitted by hydrophones 14 of towed array 10. The formatted data is then passed to transmitter 125 which sends the formatted data on the towed array at its appropriate time slot. The integration of the non-acoustic data is synchronized at its appropriate transmission time slot which is based upon its transmitter address and not its position in towed array 10.

Voltage/current regulator 126 taps power for electronics portion 120 from common line 20 which runs the length of towed array 10 to supply power to non-acoustic modules 12 and hydrophones 14. Common line 20 also represents the data transmission line of towed array 10 for carrying data and clock signals therealong. Typically, common line 20 is a coaxial cable. Voltage/current regulator 126 transitions the voltage and current passed on common line 20 to levels suitable for the remainder of electronics portion 120. Since the power levels are typically higher on common line 20 at the forward end of towed array 10, voltage/current regulator 126 downwardly adjusts the levels to allow placement of each non-acoustic module 12 anywhere in towed array 10. (In terms of the above-disclosed heading and depth sensors, voltage/current regulator 126 provides both +5 VDC and +12 VDC.)

Figure 3:
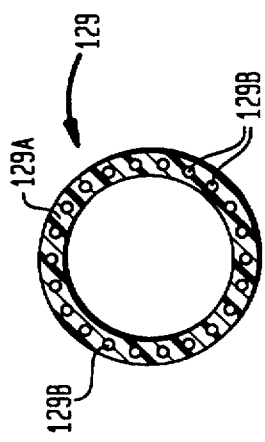
FIG. 3 is a cross-sectional view of the reinforced hose used to house the electronics of the non-acoustic sensor module.

Each non-acoustic module 12 must be capable of being placed anywhere in towed array 10. Accordingly, hose 129 must satisfy a variety of constraints. More specifically, hose 129 must be flexible for purposes of reeling of towed array 10 strong enough to handle the tension associated with placement in the forward end of towed array 10, and stable in terms of its length so that it does not stretch in length after extended use. In the preferred embodiment, hose 129 includes a hose matrix material with strength members embedded therein. One such hose design is shown in cross-section in FIG. 3 where hose 129 is formed from polyurethane matrix 129A with braided cord serving as internal strength members 129B that run the length of hose 129. Braided cord made of "DACRON" brand fibers, for example,is available commercially from Cortland Line Company. Typically, hose 129 is pre-stretched so that its length will remain stable when it is part of non-acoustic module 12.

The advantages of the present invention are numerous. The towed array incorporates one or more dedicated non-acoustic sensor modules that can be placed anywhere in a towed sonar array. The sensed data is easily integrated with acoustic data on a common transmission line. Acoustic data is not comprised since each non-acoustic sensor module does not interrupt the acoustic aperture of the hydrophone spacing in the sonar array. The number of non-acoustic sensor modules can be one, two or more. The non-acoustic sensor modules can be located within the sonar array configuration at other positions than those shown in the drawings. Each non-acoustic sensor module could also house additional non-acoustic sensors as required by the application.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A dedicated non-acoustic sensor module for placement in a towed sonar array having N hydrophone groups defining N acoustic apertures, each of said N acoustic apertures occupying a specified length of said towed sonar array, said non-acoustic sensor module comprising:

a flexible reinforced hose;

at least one non-acoustic sensor mounted in said flexible reinforced hose for generating an output signal in response to a sensed condition;

processing means mounted in said flexible reinforced hose for formatting said output signal for passage by said towed sonar array;

transmitting means mounted in said flexible reinforced hose for sending said formatted output signal along said towed sonar array; and said non-acoustic sensor module having a length that is n times said specified length where n is a whole number satisfying the relationship $1 \leq n \leq N$.

2. A non-acoustic sensor module as in claim 1 wherein said flexible reinforced hose comprises:

a polyurethane hose; and a plurality of braided cords embedded within said polyurethane hose and extending longitudinally therealong.

3. A non-acoustic sensor module as in claim 2 wherein each of said plurality of braided cords is made from DACRON brand fibers.

4. A non-acoustic sensor module as in claim 1 wherein said at least one non-acoustic sensor includes a heading sensor and a depth sensor.

5. A towed array comprising:

an array of N hydrophone groups structurally interconnected and coupled to a common data transmission line, each of said N hydrophone groups defining a part of an acoustic aperture occupying a specified length along said towed array; and at least one non-acoustic sensor module structurally connected in-line with said array of N hydrophone groups and coupled to said common data transmission line, said at least one non-acoustic sensor module having a length that is n times said specified length where n is a whole number satisfying the relationship $1 \leq n \leq N$.

6. A towed array as in claim 5 wherein said at least one non-acoustic sensor module comprises:

a flexible reinforced hose;

at least one non-acoustic sensor mounted in said flexible reinforced hose for generating an output signal in response to a sensed condition;

processing means for formatting said output signal for passage on said common data transmission line; and transmitting means for sending said formatted output signal along said common data transmission line.

7. A towed array as in claim 6 wherein said flexible reinforced hose comprises:

a polyurethane hose; and a plurality of braided cords embedded within said polyurethane hose and extending longitudinally therealong.

8. A non-acoustic sensor module as in claim 7 wherein each of said plurality of braided cords is made from DACRON brand fibers.

9. A non-acoustic sensor module as in claim 6 wherein said at least one non-acoustic sensor includes a heading sensor and a depth sensor.

10. A towed array as in claim 5 wherein said at least one non-acoustic sensor module comprises:

a first non-acoustic sensor module positioned at one end of said array of N hydrophone groups; and a second non-acoustic sensor module positioned at the other end of said array of N hydrophone groups.

11. A towed array as in claim 10 further including a third non-acoustic sensor module positioned between any two of said N hydrophone groups.

* * * * *